US009348042B2

(12) United States Patent
 Sallas (10) Patent No.: US 9,348,042 B2
(45) Date of Patent: May 24, 2016

(54) BURIED PRESSURIZED VOLUMETRIC SOURCE AND METHOD

(75) Inventor: John J. Sallas, Plano, TX (US)

(73) Assignee: CGG SERVICES SA, Massy (FR)

( * ) Notice: Subject to any disclaimer, the term of this patent is extended or adjusted under 35 U.S.C. 154(b) by 1014 days.

(21) Appl. No.: 13/337,431

(22) Filed: Dec. 27, 2011

(65) Prior Publication Data

US 2013/0163386 A1  Jun. 27, 2013

(51) Int. Cl.
  *G01V 1/135* (2006.01)
  *G01V 1/047* (2006.01)

(52) U.S. Cl.
  CPC ...................... *G01V 1/047* (2013.01)

(58) Field of Classification Search
  CPC ........................ G01V 2210/00; G01V 1/135
  USPC ....... 175/44; 702/17; 367/144, 189; 181/104, 181/106, 113, 117
  See application file for complete search history.

(56) References Cited

U.S. PATENT DOCUMENTS

| | | | | |
|---|---|---|---|---|
| 3,221,833 A | * | 12/1965 | Malmberg | 181/106 |
| 3,309,656 A | * | 3/1967 | Godbey | 367/85 |
| 3,346,066 A | * | 10/1967 | Miller, Jr. et al. | 181/106 |
| 3,716,111 A | * | 2/1973 | Lavergne | 181/113 |
| 3,718,205 A | | 2/1973 | Fair et al. | |
| 3,860,902 A | * | 1/1975 | Galle | 367/83 |
| 3,876,016 A | * | 4/1975 | Stinson | 175/45 |
| 3,958,661 A | * | 5/1976 | Dransfield et al. | 181/117 |
| 4,033,429 A | * | 7/1977 | Farr | 181/106 |
| 4,042,063 A | * | 8/1977 | Waters | 181/119 |
| 4,252,210 A | * | 2/1981 | Sodich | 181/119 |
| 4,334,592 A | * | 6/1982 | Fair | 181/121 |
| 4,569,412 A | * | 2/1986 | Bouyoucos et al. | 181/119 |
| 4,632,212 A | * | 12/1986 | Benzing | 181/106 |
| 4,722,417 A | | 2/1988 | Selsam | |
| 4,796,723 A | | 1/1989 | Laurent et al. | |
| 4,805,727 A | * | 2/1989 | Hardee et al. | 181/106 |
| 4,815,557 A | * | 3/1989 | Duwe | 181/106 |
| RE32,995 E | | 7/1989 | Fair | |
| 4,858,718 A | | 8/1989 | Chelminski | |
| 4,862,990 A | | 9/1989 | Cole | |
| 5,031,717 A | | 7/1991 | Hardee et al. | |
| 5,113,966 A | | 5/1992 | Gregory et al. | |
| 5,137,109 A | | 8/1992 | Dorel | |
| 5,327,399 A | | 7/1994 | Asada et al. | |
| 5,713,558 A | | 2/1998 | Junkers | |
| 5,724,311 A | * | 3/1998 | Laurent et al. | 367/57 |
| 6,584,038 B2 | | 6/2003 | Meunier | |
| 6,978,745 B1 | * | 12/2005 | Flohr | 123/90.11 |
| 7,007,643 B2 | * | 3/2006 | Afjeh et al. | 123/90.12 |
| 7,013,924 B1 | * | 3/2006 | Meyers et al. | 138/30 |
| 7,424,928 B2 | * | 9/2008 | Cox et al. | 181/111 |
| 7,499,378 B2 | | 3/2009 | Buttin et al. | |
| 7,813,224 B2 | * | 10/2010 | Krumhansl et al. | 367/189 |

(Continued)

*Primary Examiner* — Luke Ratcliffe
*Assistant Examiner* — Amienatta M Ndure Jobe
(74) *Attorney, Agent, or Firm* — Patent Portfolio Builders PLLC (57) ABSTRACT

A seismic source configured to generate seismic waves underground. The source includes a tank configured to be buried underground, the tank having a cavity; an actuation mechanism provided inside the cavity, wherein the actuation mechanism is configured to have at least one movable part that moves back and forth to generate a seismic wave having a desired frequency; and a first fluid provided inside the cavity and around the actuation mechanism and configured to transform the back and forth movement of the at least one movable part into a varying pressure that directly acts on walls of the tank.

22 Claims, 8 Drawing Sheets

(56) References Cited

U.S. PATENT DOCUMENTS

| | | |
|---|---|---|
| 7,823,689 B2 | 11/2010 | Aronstam et al. |
| 2005/0197781 A1* | 9/2005 | Harmon et al. ................. 702/14 |
| 2010/0101861 A1 | 4/2010 | Chang |
| 2010/0195436 A1 | 8/2010 | Kamata et al. |
| 2012/0243377 A1* | 9/2012 | Morozov ............... G01V 1/135 367/143 |

* cited by examiner

BURIED PRESSURIZED VOLUMETRIC SOURCE AND METHOD

BACKGROUND

1. Technical Field

Embodiments of the subject matter disclosed herein generally relate to methods and systems for generating seismic waves and, more particularly, to mechanisms and techniques for generating seismic waves with buried volumetric sources.

2. Discussion of the Background

Permanent monitoring of oil production (e.g., reservoir monitoring) can be accomplished by passive listening or by active sourcing. Passive listening involves listening with seismic receivers for naturally-occurring seismic waves while active sourcing involves deploying seismic sources over a certain area and generating the seismic waves in a controlled manner. Active sourcing may use sources provided at the surface of the earth or sources buried beneath the surface of the earth. Benefits have been demonstrated from buried sources compared to surface sources. In particular, it has been found that sources buried beneath the weathered layer are more repeatable than surface sources primarily because they are located in consolidated material in a stable coupling environment and not subject to changes due, for example, to soil moisture content that a surface source might see. For time-lapse reservoir monitoring a time-invariant source signal is most helpful.

Conventional land seismic generation generally employs multiple vibrators acting together and initiated simultaneously or randomly. In land-based operations, the vibrators are positioned at a source location and synchronized to a pilot sweep signal. Once activated, the vibrators generate a sweep that typically lasts between five and twenty seconds and typically spans a predetermined range of frequencies. A recording system that is connected to a plurality of receivers, typically geophones for land-based seismic exploration, is employed to receive and record the response data. The vibrators are then moved to a new source location and the process is repeated.

However, existing land sources that are appropriate for burying, e.g., piezoelectric stack vibrators, tend to be relatively low-energy, particularly at low frequencies. Also piezoelectric stack vibrators that undergo axial extension tend to produce significantly more SV-wave energy than P-wave. Thus, a more energetic buried source that also produces more P-wave energy would be advantageous. Therefore, there is a need to develop a land source and associated method that are capable of generating more energy underground than the existing sources.

BRIEF SUMMARY OF THE INVENTION

According to an exemplary embodiment, there is a land seismic source configured to generate seismic waves underground. The source includes a tank configured to be buried underground, the tank having a cavity; an actuation mechanism provided inside the cavity, wherein the actuation mechanism is configured to have at least one movable part that moves back and forth to generate a seismic wave having a desired frequency; and a first fluid provided inside the cavity and around the actuation mechanism and configured to transform the back and forth movement of the at least one movable part into a varying pressure that directly acts on walls of the tank.

According to another exemplary embodiment, there is a land seismic source configured to generate seismic waves underground. The source includes an outer tank having a cavity filled with a working fluid; an inner tank provided inside the cavity; and first and second actuation devices provided inside the inner tank, each of the first and second actuation devices having a corresponding piston. The working fluid transforms back and forth movement of the pistons of the first and second actuation devices into a varying pressure that directly acts on walls of the outer tank.

According to still another exemplary embodiment, there is a method for actuating a land seismic source. The method includes a step of burying the land seismic source underground; a step of sending commands to an actuation mechanism provided inside a cavity of the land seismic source, wherein the actuation mechanism is configured to have at least one movable part that moves back and forth, when instructed by the commands; and a step of transforming with a first fluid, provided inside the cavity and around the actuation mechanism (105), the back and forth movement of the at least one movable part into a varying pressure that directly acts on walls of the tank to generate a seismic wave having a desired frequency.

According to yet another exemplary embodiment, there is a land seismic source configured to generate seismic waves underground. The source includes a tank configured to be buried underground, the tank having a cavity filled with a fluid; and an actuation mechanism fluidly connected to the tank and configured to pump the fluid in and out to generate a varying pressure that directly acts on walls of the tank. The varying pressure generates the seismic waves.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic source that is buried, for example, in a borehole, for reservoir monitoring. However, the embodiments to be discussed next are not limited to a borehole seismic source but may be applied to a surface land source.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a land seismic source that is configured to be buried underground, for example, in a borehole. The seismic source is configured to act as a volumetric source, i.e., the source has a cavity that hosts an actuation mechanism that can increase and/or decrease the volume of the source as desired by an operator. The cavity of the source may be buried so that a tank that hosts the cavity is in direct contact with the underground. Thus, changes in the volume of the source are transmitted as waves to the underground. Alternatively, the cavity of the source may be buried in cement or other materials for a better interface between the source and the ground. In one application, the source generates p-waves and reduced levels s-waves. In still another application, the source is configured to emit frequencies in the range of 10 to 200 Hz. In yet another application, the seismic source is configured to be deployed in a borehole, at a modest depth between 3 and 100 m. While the source may be deployed to greater depths, it is noted that the modest depth is preferred for keeping the cost low because, typically, a number of buried sources might be deployed as part of a reservoir monitoring system.

Figure 1:
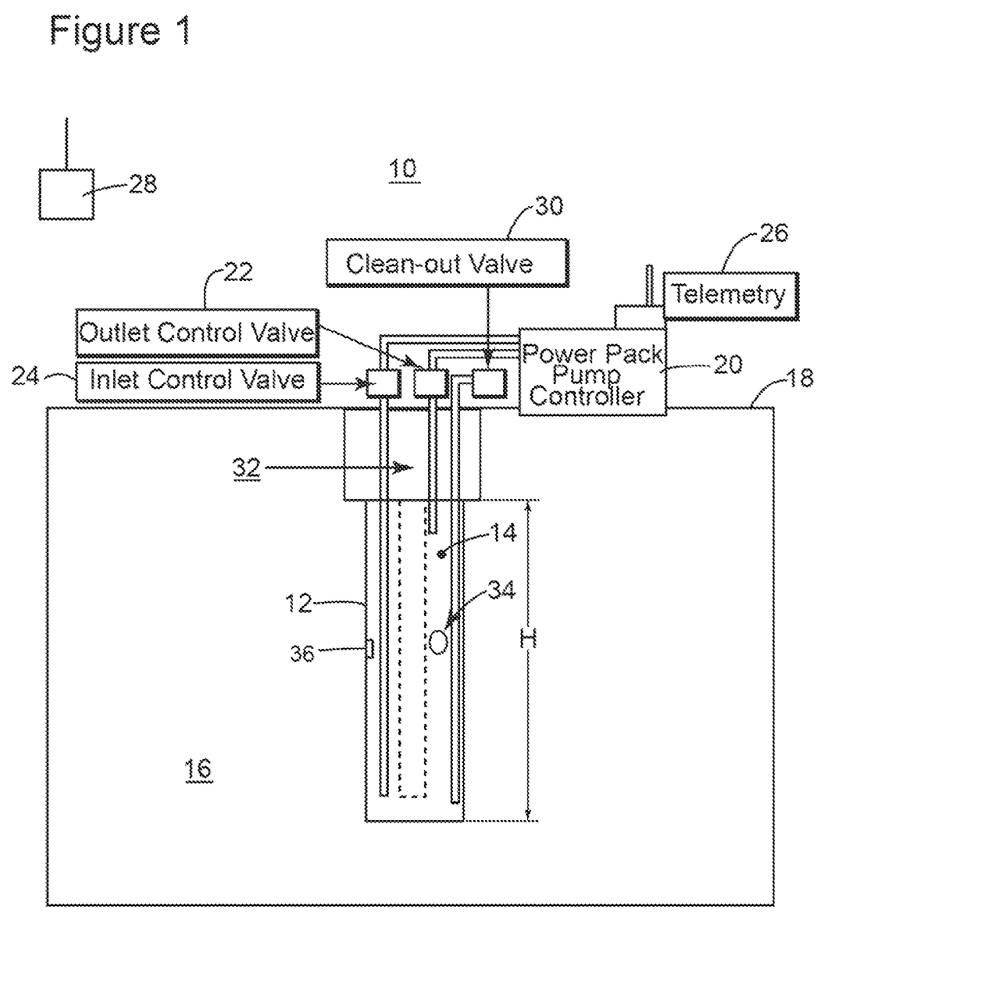
FIG. 1 is a schematic diagram of a buried seismic source according to an exemplary embodiment.

The novel source may be driven in an impulsive mode or in a vibratory swept sine mode. For example, FIG. 1 illustrates a seismic source 10 configured to operate in an impulsive mode. The seismic source 10 includes a tank 12 filled with fluid 14 (e.g., mineral oil or water) that is buried underground 16 and in close contact with the ground. At the surface 18, a pump 20 is used to feed fluid into the tank 12 and valves 22 and 24 are used to control the out-flowing and in-flowing of the fluid between the tank 12 and the pump 20. The pump 20 may include a power pack and controllers. With these controls, which may be operated remotely via telemetry unit 26 from a central control and recording station 28, it is possible to build up pressure in the tank that will expand its volume and then quickly release it, causing a pressure pulse and generating p-wave seismic energy. Optionally, a clean-out line equipped with valve 30 may be used to drain the fluid from the tank 12. A cement plug 32 may be provided on top of the tank 12 for burying the source, and a seismic sensor 34 (e.g., hydrophone) may be placed in the tank 12 for measuring the produced seismic waves. Also, a pressure transducer 36 may be provided inside the tank 12 for measuring the fluid pressure acting on the walls in contact with the earth. This configuration is best suited when the tank 12 is buried at a shallow depth because if the inlet and outlet lines are too long the high frequency output of the system may be compromised due to the fluid inertance imposed by long passageways. The fluid inertance will tend to limit the rate at which pressure can change.

Figure 2:
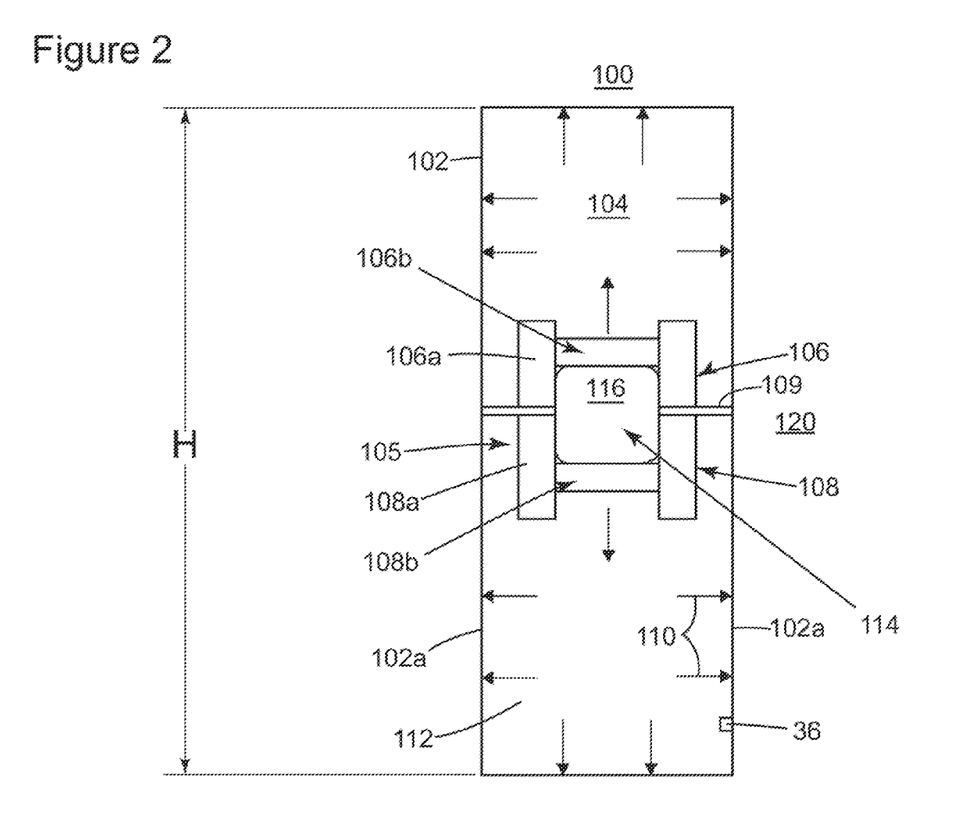
FIG. 2 is a schematic diagram of a seismic source configured to change its volume according to an exemplary embodiment.

Alternatively, the seismic source may be a vibratory source as illustrated in FIG. 2. The source 100 has a tank 102 that includes a cavity 104. An actuation mechanism (e.g., piston arrangement) 105 is provided inside the cavity 104 and may include two back-to-back actuators 106 and 108. The actuators 106 and 108 may be electromagnetic actuators. The actuation mechanism may be fixed relative to the tank 102 with a support element 109. The support element 109 may be a bracket. In one application, one or more than two electromagnetic actuators are used. Each actuator may include a coil 106a or 108a that is configured to electromagnetically displace a corresponding piston 106b or 108b. Alternatively, the piston may be driven by a motor and cam system at a frequency geared to the motor speed.

The piston motion causes an increase and decrease in the pressure 110 of a working fluid 112 inside the tank 102, causing an increase and decrease in pressure on the ground 120. These pressure changes cause a seismic p-wave signal to propagate from the source into the ground. The frequency of the generated p-wave may be controlled by controlling the movement of the pistons 106b and 108b. It is noted that electromagnetic actuators have a larger displacement than conventional piezoelectric units.

To transform the displacement of the pistons 106b and 108b at a low force into a large force with smaller displacements, as desired for the present volumetric source, a fluid may be used for coupling, as discussed next. The volumetric source 100, as already noted above, is configured to change one or more dimensions and, thus, its volume when actuated. For this reason, this source is called a volumetric source. However, because the tank 102 is made of steel or other similar material, the source 100 cannot accommodate overly large dimensional changes. Thus, it is desirable that displacement of the pistons with low force be transformed into a small displacement with high force to act on the walls 102a of the tank 102.

According to the exemplary embodiment illustrated in FIG. 2, the piston arrangement 105 is immersed into the working fluid 112 so that the working fluid 112 couples the pistons 106b and 108b to the walls 102a of the tank 102. At the same time, the working fluid also cools the coils 106a and 108a. The back sides of the pistons 106b and 108b form an inner cavity 114. This inner cavity 114 may be configured to trap another fluid 116 (e.g., air). Thus, the back sides of the pistons 106b and 108b work against the fluid 116. In this case, the fluid 116 works to counteract the hydrostatic pressure in the first fluid 104. In other words, the fluid 116 works as a spring.

Figure 3:
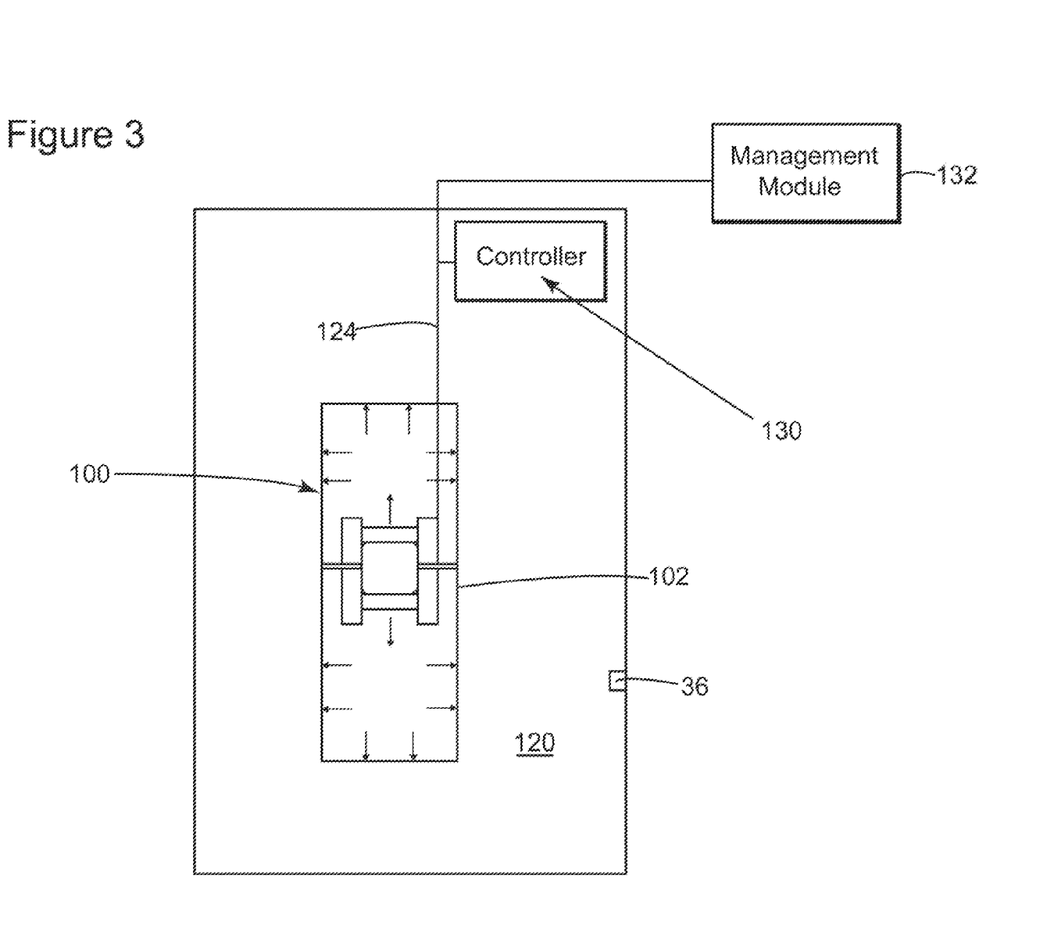
FIG. 3 is a schematic diagram of a seismic source and associated controllers configured to change its volume according to an exemplary embodiment.

FIG. 3 shows the source 100 linked by appropriate pipes and/or cables 124 to a controller 130 and a management module 132. The controller 130 may control the amount of working fluid and/or current (to the actuator mechanism) provided to the tank 102. In addition, the controller 130 may provide telemetry control to the source. The management module 132 may include pneumatic fill, pneumatic monitoring, fluid fill, fluid monitoring, electrical power, electrical control of the actuators, data retrieval and data processing functionalities.

The dimensions of the source 100 may differ from application to application. For example, the height H of the source may be between 1 and 3 m. A cross-section of the source may be circular, elliptical, etc. If the cross-section is circular, the radius of the source may be between 10 and 50 cm. In general, both P-wave and SV-waves will be produced by the source. As the height of the tank grows relative to its diameter, the proportion of SV-wave produced relative to P-wave will increase. A tank height roughly equal to tank diameter will tend to maximize P-wave production. Of course, the dimensions of the pistons may differ from application to application, and these dimensions need proper matching to the fluid volume and borehole contact area.

The embodiments shown in FIGS. 2 and 3 may be modified to have, for example, flextensional mechanical transformers that are capable of directly acting on the walls of the tank with no fluid interface. Alternatively, the pistons may be replaced with a diaphragm that is actuated with the help of valves and fluid lines extending from the surface. Further, the working fluid could be pressurized to increase the effective bulk modulus if there is some entrained air in the fluid and collapse any bubbles. This would require the pneumatic pressure to be increased as well. Optionally, an aluminum slug may be added to the working fluid to reduce the trapped oil volume and provide a means to help sink heat into the cement/rock around the tank. This feature may reduce energy dissipation, and may also reduce the amount of piston travel required to achieve the same force. Thus, this feature may be a way to keep the same trapped oil volume and widen or elongate the device to obtain even more borehole contact area.

Figure 4A:
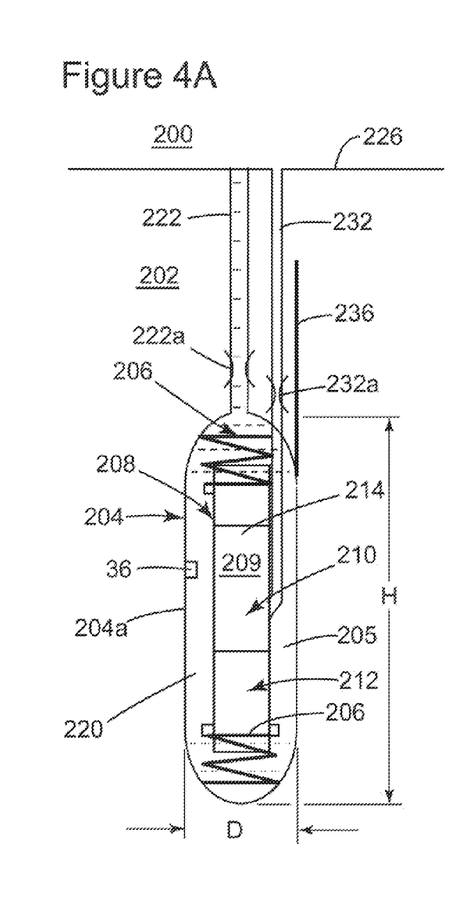
FIGS. 4A-B are schematic diagrams of a buried seismic source and fluid reservoirs located on the surface according to an exemplary embodiment.
Figure 4B:
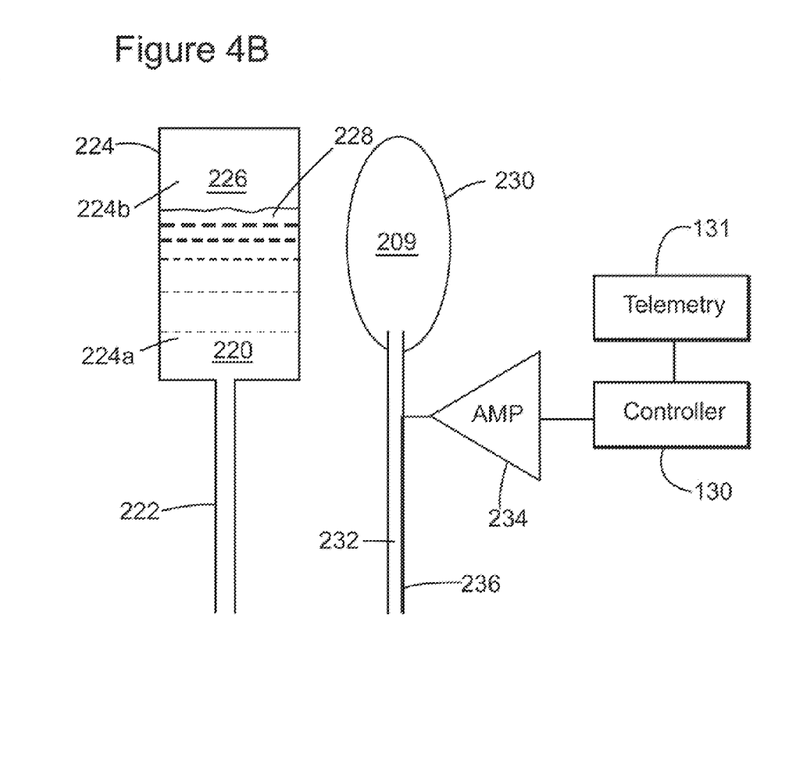

FIGS. 4A-B illustrate in more detail an exemplary embodiment in which the seismic source includes a pressurized-nitrogen-filled bladder (or diaphragms) between the two opposing pistons of FIG. 2. The bladder provides an air-spring to balance the hydrostatic forces acting on the pistons. More specifically, FIG. 4A shows a seismic source 200 buried underground 202 and having a cylindrical shape. As noted above, the shape may also be elliptical. The source 200 includes a tank 204 having walls 204a in direct contact with the ground 202. In one exemplary embodiment, the walls 204a are buried in cement. A diameter D of the source may be around 0.3 m and a height of the source may be around 1.15 m. Other dimensions are possible. The tank 204 has a cavity 205 that is filled with a working fluid 220.

Springs 206 may be provided at ends of the actuation mechanism 208 for locating it at a central position in the tank 204. The actuation mechanism 208 may be the one described in FIG. 2, i.e., the actuation mechanism 105 having electromagnetic actuated pistons. An inner cavity 210 is formed between actuation devices 212 and 214 of the actuation mechanism 208 and may be filled with air or other gas 209 to form an air-spring. The working fluid 220 is provided inside the cavity 205 of the tank 204, around the actuation mechanism 208.

The fluid 220 may communicate through a pipe 222 with a fluid reservoir 224, which is shown in FIG. 4B. The fluid reservoir may be located above ground or near a surface 226 of the ground. The fluid reservoir 224 is configured to include in a lower chamber 224a the working fluid 220 and in an upper chamber 224b a pressurized fluid 226, e.g., nitrogen. The pressurized fluid 226 or the working fluid 220 may be contained by a bladder 228 (or piston) and the pressurized fluid 226 is configured to apply a desired hydrostatic pressure on the working fluid 220 inside the tank 204.

Similarly, the fluid 209 (e.g., a gas like nitrogen) inside the inner cavity 210 may communicate with a reservoir 230 through a pipe 232. An amplifier 234 may be connected to the actuation mechanism 208 through a cable 236 for controlling the back-and-forth motion of the pistons of the actuation mechanism. The amplifier 234 may be controller by a controller 130 as will be discussed next. The controller 130 may be connected to a telemetry unit 131 that is configured to receive commands from and/or transmit source information to a central reservoir monitoring management system (not shown) located at a remote location. One purpose of the fluid reservoirs 224 and 230 is now discussed. When in use, the actuation mechanism may produce heat which makes the working fluid 220 and/or the fluid 209 expand, i.e., increase their volume. Because this increase in volume may be substantial, i.e., it may make the pistons shift by tens of centimeters, there is a need to provide a hydrostatic pressure compensation mechanism. Thus, by using the reservoirs 224 and 230, the hydrostatic pressure difference between fluids 220 and 209 may be controlled, e.g., equalized.

FIG. 4A also shows flow control elements 222a and 232a that are configured to control a flow of a fluid through corresponding pipes 222 and 232. These flow control elements may be orifices or valves that are used to restrict the dynamic flow of oil. If the passageways to the reservoir and accumulator at the surface are long, they will tend to have enough inertance so that dynamic pressures due to piston motion in the cavity 220 are not significantly diminished. However, if the passageways are short, it might be necessary to install either orifices or poppet valves that can be opened and closed at the surface to close off these passageways when the pistons are activated during the sweep. The flow control elements can then open them when the source is not swept to equalize the hydrostatic pressure, if needed.

Figure 5A:
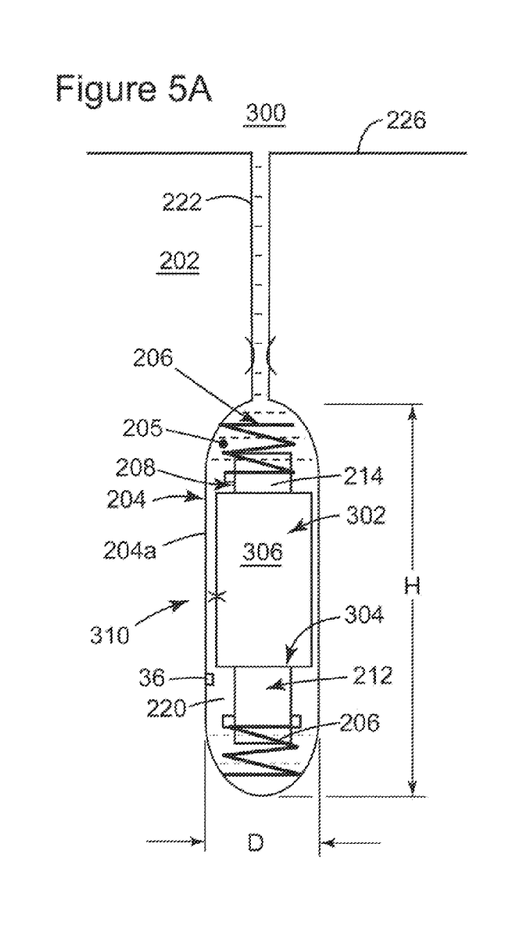
FIGS. 5A-B are schematic diagrams of a seismic source using a single fluid reservoir according to an exemplary embodiment.
Figure 5B:
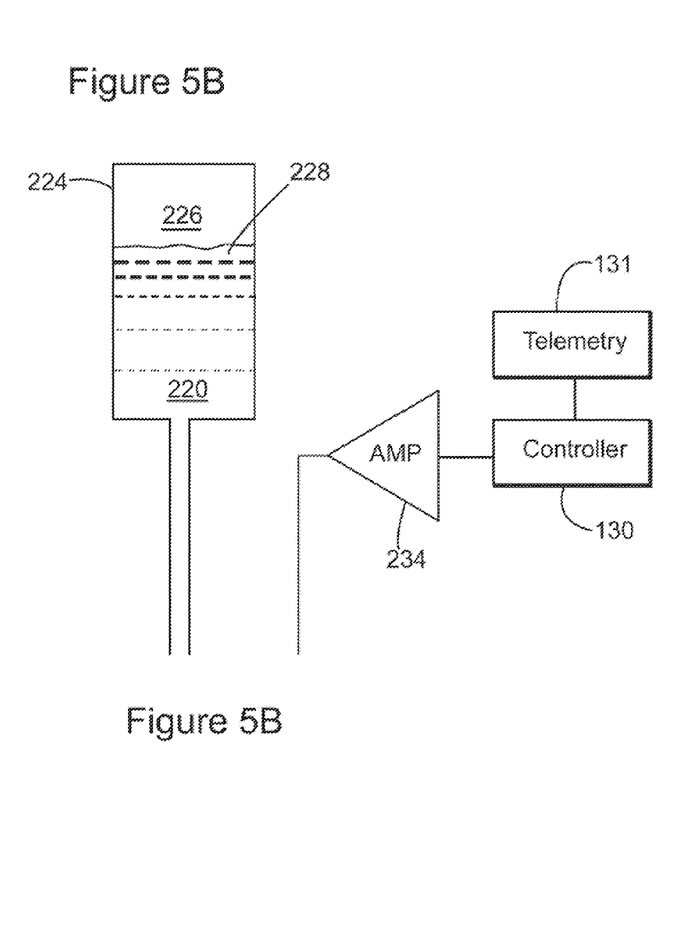

The seismic source 200 may be modified as shown in FIGS. 5A-B. Source 300 shown in FIGS. 5A-B includes most of the elements of source 200 and, for this reason, those elements have the same reference number as in FIGS. 4A-B. A description of these elements is omitted herein. However, one difference relative to the source of FIGS. 4A-B is that the inner cavity 210 is replaced by an oil spring mechanism 302. The oil spring mechanism 302 is achieved by using an inner tank 304 having solid walls, for example, made out of steel. The inner tank 304 is filled with oil 306 and has a volume V1. The working fluid 220 provided between the tank 204 and the inner tank 304 has a volume V2. In one application, the volume V1 is larger than the volume V2, to ensure that the oil spring created by V1 is much smaller than the oil spring created by V2, thus guaranteeing that most of the force created by the motion of the pistons goes into increasing the dynamic fluid pressure in V2 to impart seismic vibrations into the surrounding rock formation. The trapped fluid volume in V2 can be reduced as mentioned before by including, for example, an aluminum slug in the outer cavity. The source 300 has a higher resonance than the source 200 because the oil spring mechanism is stiffer than the air-spring of source 200.

In one embodiment, the working fluid 220 and the fluid 306 are the same. In this case, a small orifice 310 to provide a leakage path between the working fluid 220 of the tank 204 and the fluid 306 of the inner tank 304 so that the two fluids communicate with each other. The orifice is sized so that the flow rate between the inner and outer tanks is small enough to block any rapid dynamic pressure difference, but large enough to allow for hydrostatic fluid pressure equalization. This equalization relieves any static pressure buildup between the outer and inner piston face so that the DC current supplied to for example a linear electro-dynamic actuator is zero and additional heat is not generated by any DC current that might otherwise have to be applied to keep the piston centered in its range of travel. Thus, the reservoir 224 is configured to handle the thermal fluid expansion by maintaining a balanced hydrostatic pressure without the need of a gas filled cavity 210 and gas reservoir 230, as in the embodiment shown in FIGS. 4A-B.

Figure 6A:
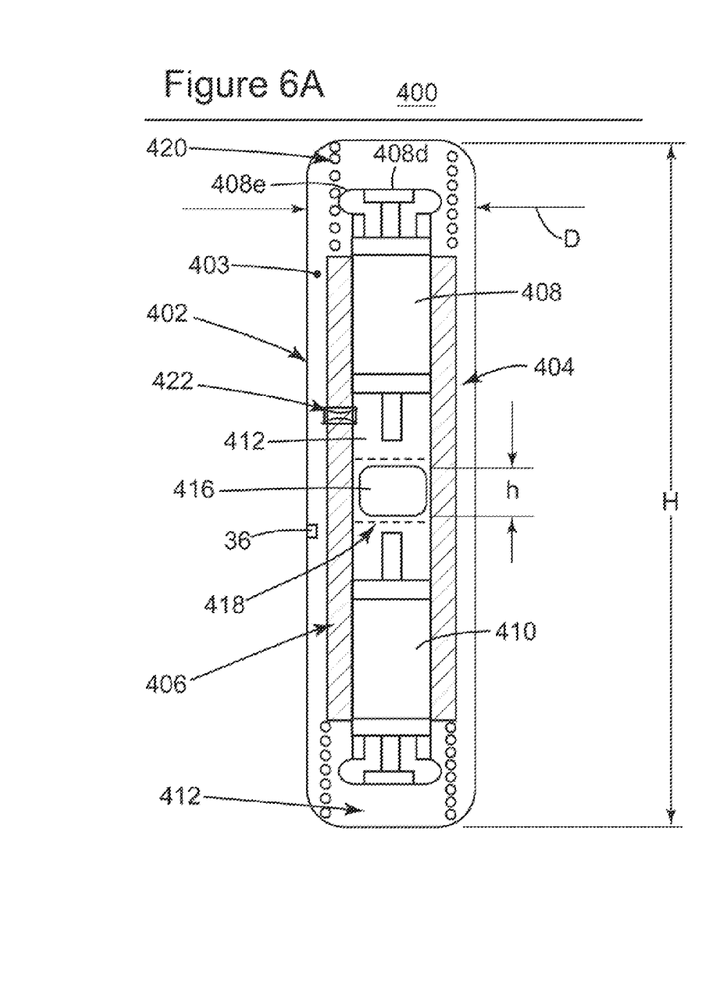
FIGS. 6A-B are schematic diagrams of a seismic source having plural actuating mechanisms according to an exemplary embodiment.
Figure 6B:
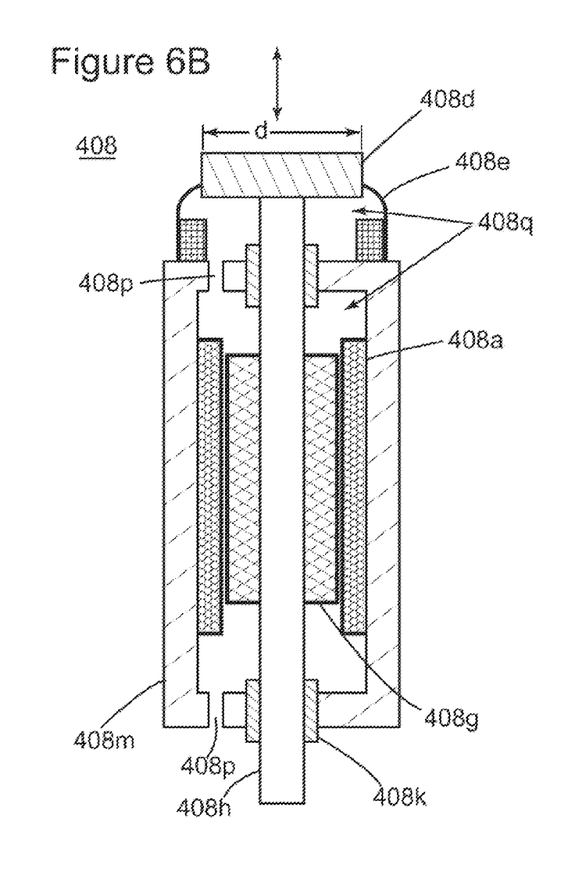

Another exemplary embodiment is discussed with regard to FIGS. 6A-B. A seismic source 400 has an outer tank 402 that is also buried underground. The outer tank 402 has a cavity 403 configured to accommodate an actuation system 404. The actuation system 404 includes an inner tank 406 that includes two actuator devices 408 and 410. The two actuator devices may be identical. An example of an actuator device that produces a magnetic field that interacts with a permanent magnet is shown in FIG. 6B. The actuator device 408 includes a coil 408*a*, a moving magnet 408*g* that is attached to a shaft 408*h*, a piston 408*d* that is attached to the shaft 408*h*, a flexible member like a diaphragm or bellows 408*e*, a guide means like bushings 408*k* and an outer case 408*m*. The coil can be energized by power electronics that are located remotely through a cable that is not shown. The outer piston face acts on the working fluid 412. Energizing the coil 408*a* produces a Lorentz force that acts on the permanent magnet 408*g* and causes the magnet to move axially, for example, in an upward direction. A reversal of the current applied to the coil 408*a* will cause a reversal of the Lorentz force acting on the permanent magnet and the piston will retract. For example, a sinusoidal varying coil current will induce reciprocal sinusoidal motion of the permanent magnet and attached piston. The bushings 408*k* act as guides to keep the magnet centered and allow axial motion. The diaphragm or bellows 408*e* are connected between the piston 408*d* and the actuator case 408*m*. The interior volume of the actuator may be filled with a nonconductive fluid, like mineral oil 408*q*. The fluid 408*q* provides a means for fluid cooling of the coil 408*a*. The diaphragm or bellows 408*e* isolates the pressure in working fluid 412 developed by the action of the piston from the fluid in the interior of the actuator 408*q*. Holes 408*p* allow for the fluid to circulate freely in the interior of the actuator to promote cooling and the free motion of the piston thereby allowing the fluid 408*q* to communicate with 412. Other types of actuator devices may be used as would be recognized by those skilled in the art. A diameter d of the piston 408*d* may be about 6 cm while a diameter D of the entire source may be around 18 cm. Other dimensions are possible.

The two actuator devices 408 and 410 may be fixed at ends of the inner tank 406. Thus, the working fluid 412 may be allowed between the actuator devices. A sealed and pressurized fluid bladder 416 may be provided between the free ends of the actuator devices 408 and 410. The bladder may be filled with nitrogen under pressure. The bladder is supported by screens 418. Screens 418 prevent the bladder 416 to drift toward one of the actuator devices and also allow the fluid 412 to move past the screens. A height h of the bladder may be around 0.4 m while a height of the entire source may be around 2.2 m. Other dimensions are also possible. The inner tank 406 may be centered relative to the outer tank 402 by using springs 420. In other words, the springs provided above and below the inner tank 406 keep the actuator devices centered inside the outer tank 402 and provide vibration isolation from the tank's walls. Further, the inner tank may have an orifice 422 that communicates the fluid inside the inner tank with the fluid of the outer tank 402 to help balance, as stated before, the hydrostatic pressure across the pistons.

The bladder allows for fluid expansion due to temperature rise. For the case illustrated in FIGS. 6A-B, a 50° C. temperature rise may cause about a 30% decrease in the air volume inside the bladder. Thus, the air bladder helps to maintain constant the hydrostatic pressure and lowers the internal spring rate. The screens 418 keep the bladder from over-expanding when the fluid is not under pressure, e.g., before installation.

In one exemplary embodiment, the walls of the outer tank 402 are made of thin steel while the walls of the inner tank 406 are made of thick steel. The thick-walled inner tank 406 isolates the internal oil volume of the actuator devices from the volume of the fluid 412.

Figure 7:
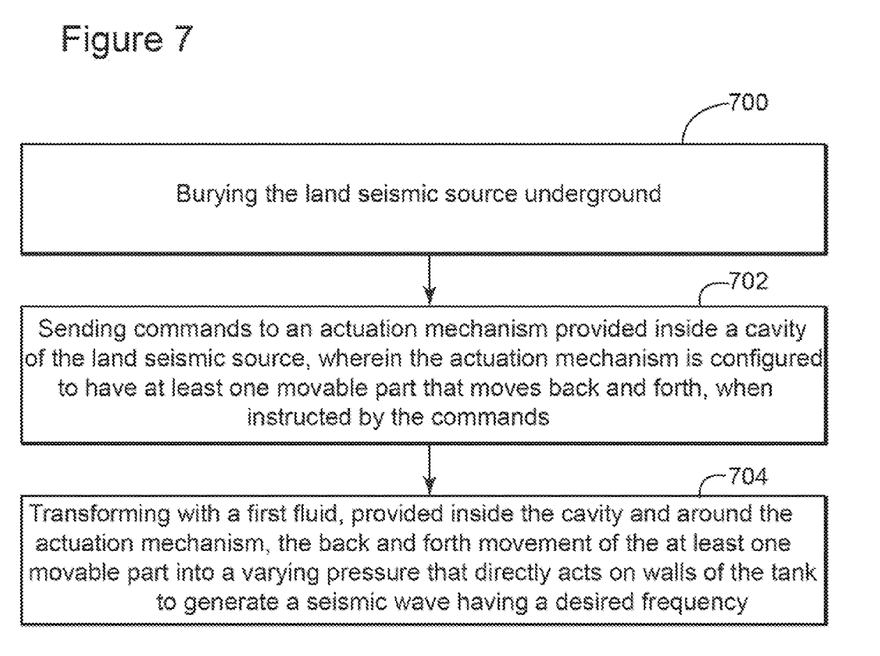
FIG. 7 is a flowchart of a method for actuating a buried volumetric seismic source according to an exemplary embodiment.

A method for driving a source as described above is now discussed with regard to FIG. 7. FIG. 7 illustrates a method for actuating a land seismic source that includes a step 700 of burying the land seismic source underground; a step 702 of sending commands to an actuation mechanism provided inside a cavity of the land seismic source, wherein the actuation mechanism is configured to have at least one movable part that moves back and forth, when instructed by the commands; and a step 704 of transforming with a first fluid, provided inside the cavity and around the actuation mechanism, the back-and-forth movement of the at least one movable part into a varying pressure that directly acts on walls of the tank to generate a seismic wave having a desired frequency.

Figure 8:
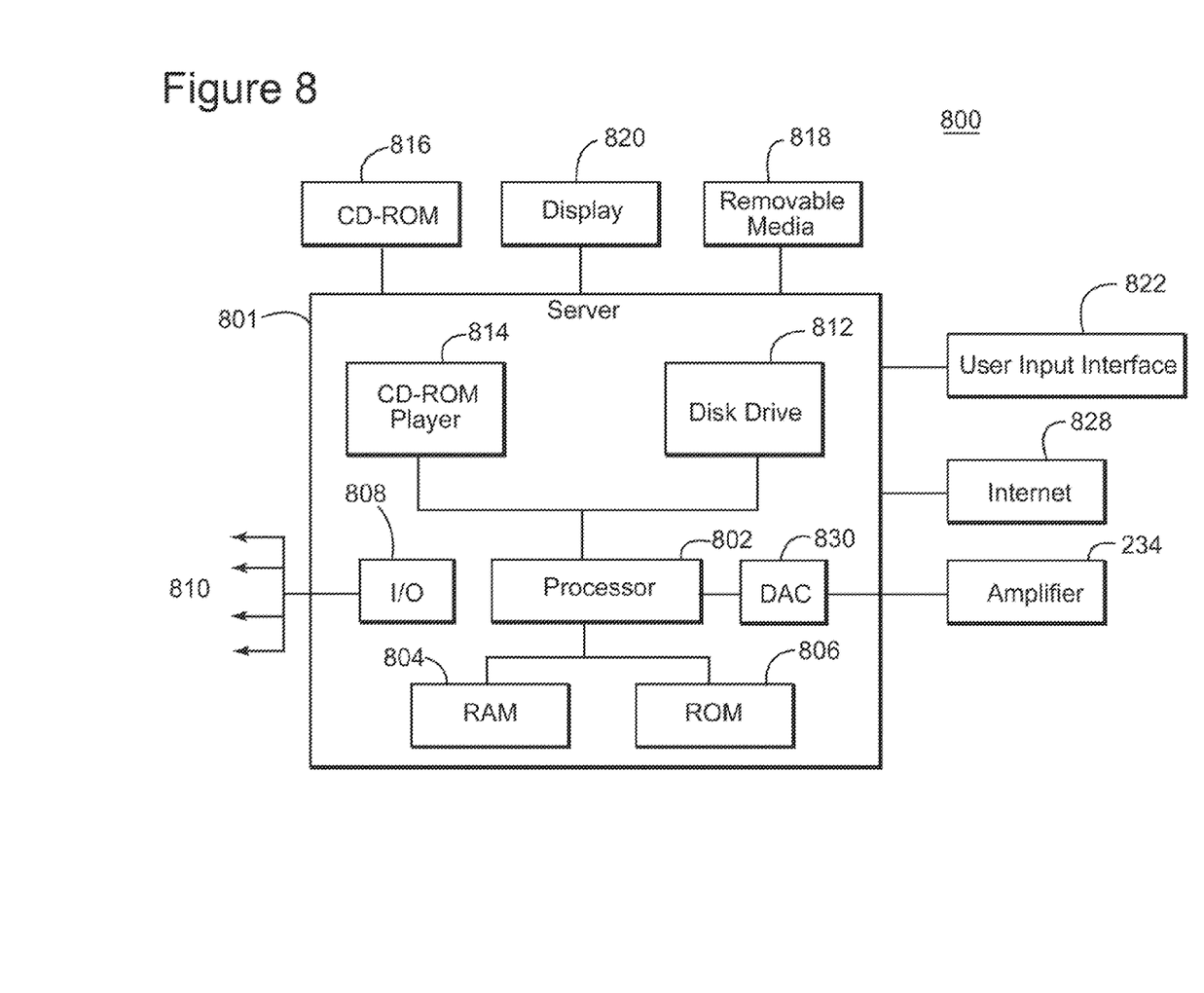
FIG. 8 is a schematic diagram of a computing device that implements a method for actuating the source.

The above-noted seismic sources may be controlled with an amplifier 234 as shown in FIGS. 4B and 5B. The amplifier 234 may be electrically connected to a controller 130. Such a controller capable of carrying out operations in accordance with the exemplary embodiments is illustrated in FIG. 8. Hardware, firmware, software or a combination thereof may be used to perform the various steps and operations described herein.

The exemplary controller 800 suitable for performing the activities described in the exemplary embodiments may include a server 801. Such a server 801 may include a central processor (CPU) 802 coupled to a random access memory (RAM) 804 and to a read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. The processor 802 carries out a variety of functions as are known in the art, as dictated by software and/or firmware instructions.

The server 801 may also include one or more data storage devices, including a hard drive 812, CD-ROM drives 814, and other hardware capable of reading and/or storing information such as DVD, etc. In one embodiment, software for carrying out the above-discussed steps may be stored and distributed on a CD-ROM 816, removable memory device 818 or other form of media capable of portably storing information. These storage media may be inserted into, and read by, devices such as the CD-ROM drive 814, the disk drive 812, etc. The server 801 may be coupled to a display 820, which may be any type of known display or presentation screen, such as LCD, LED displays, plasma displays, cathode ray tubes (CRT), etc. A user input interface 822 is provided, including one or more user interface mechanisms such as a mouse, keyboard, microphone, touchpad, touch screen, voice-recognition system, etc.

The server 801 may be coupled to other computing devices, such as the landline and/or wireless terminals via a network. The server may be part of a larger network configuration as in a global area network (GAN) such as the Internet 828, which allows ultimate connection to the various landline and/or mobile client devices. The controller may be implemented on a vehicle that performs a land seismic survey.

In addition, the controller 800 may include a digital to analog block 830 configured to take control signals to generate an analog amplifier input signal. This signal may be provided to the amplifier 234 as shown in FIG. 8.

The disclosed exemplary embodiments provide a source and a method for monitoring a reservoir. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A land seismic source configured to generate seismic waves underground, the source comprising:
   a tank configured to be buried underground, the tank having a cavity;
   an actuation mechanism provided inside the cavity, wherein the actuation mechanism is configured to have at least one movable part that moves back and forth to generate a seismic wave having a desired frequency; and
   a first fluid provided inside the cavity and around the actuation mechanism and configured to transform the back and forth movement of the at least one movable part into a varying pressure that directly acts on walls of the tank.

2. The source of claim 1, wherein the tank is cylindrical and has a height and diameter so that it can be lowered in a borehole.

3. The source of claim 1, wherein the actuation mechanism comprises:
   first and second coils; and
   first and second pistons configured to move back and forth when actuated by the first and second coils,
   wherein the first and second pistons form an inner cavity configured to hold a second fluid.

4. The source of claim 3, wherein the first fluid is oil and the second fluid is a gas.

5. The source of claim 3, wherein the first and second fluids are oil.

6. The source of claim 3, wherein the cavity is configured to communicate with a first fluid reservoir and the inner cavity is configured to communicate with a second fluid reservoir.

7. The source of claim 6, wherein the first fluid reservoir has a bladder that separates the first fluid from a third fluid under pressure.

8. The source of claim 1, further comprising:
   springs configured to maintain the actuation mechanism in a central position relative to the tank.

9. The source of claim 1, further comprising:
   an inner tank provided inside the tank and sandwiched between actuation devices of the actuation mechanism.

10. The source of claim 9, wherein the inner tank has an orifice that communicates with the cavity of the tank.

11. The source of claim 1, further comprising:
   a controller configured to control the movement of the actuation mechanism, wherein the controller is located above ground.

12. A land seismic source configured to generate seismic waves underground, the source comprising:
   an outer tank having a cavity filled with a working fluid;
   an inner tank provided inside the cavity; and
   first and second actuation devices provided inside the inner tank, each of the first and second actuation devices having a corresponding piston,
   wherein the working fluid transforms back and forth movement of the pistons of the first and second actuation devices into a varying pressure that directly acts on walls of the outer tank.

13. The source of claim 12, further comprising:
   a fluid bladder provided between the first and second actuation devices and inside the inner tank, wherein the fluid bladder is configured to accommodate a fluid and the fluid bladder is sealed.

14. The source of claim 13, further comprising:
   screens connected to the inner tank and configured to limit a movement of the fluid bladder.

15. The source of claim 12, further comprising:
   springs provided between the outer tank and the inner tank.

16. The source of claim 12, wherein one of the actuation devices comprises:
   the piston; and
   a diaphragm configured to be connected between the piston and an actuating part to form a volume that is sealed from the cavity,
   wherein the volume is configured to hold a fluid.

17. The source of claim 12, wherein there is an orifice between the inner tank and the cavity of the outer tank so that the working fluid communicates with the inner tank.

18. A method for actuating a land seismic source, the method comprising:
   burying the land seismic source underground;
   sending commands to an actuation mechanism provided inside a cavity of the land seismic source, wherein the actuation mechanism is configured to have at least one movable part that moves back and forth, when instructed by the commands; and
   transforming with a first fluid, provided inside the cavity and around the actuation mechanism, the back and forth movement of the at least one movable part into a varying pressure that directly acts on walls of the tank to generate a seismic wave having a desired frequency.

19. The method of claim 18, further comprising:
   actuating a pair of pistons in opposite directions to achieve the varying pressure.

20. The method of claim 18, further comprising:
   actuating two pairs of pistons to achieve the varying pressure.

21. A land seismic source configured to generate seismic waves underground, the source comprising:
   a tank configured to be buried underground, the tank having a cavity filled with a fluid; and
   an actuation mechanism fluidly connected to the tank and configured to pump the fluid in and out to generate a varying pressure that directly acts on walls of the tank,
   wherein the varying pressure generates the seismic waves.

22. The land seismic source of claim 21, wherein the actuation mechanism is a pump.

* * * * *